United States Patent [19]
Damron

[11] 3,885,649
[45] May 27, 1975

[54] HUNTER'S TREE STAND

[76] Inventor: John R. Damron, 1013 Guion St., Ottawa, Ill. 61350

[22] Filed: June 18, 1974

[21] Appl. No.: 480,498

[52] U.S. Cl. .............................................. 182/187
[51] Int. Cl. .............................................. A47c 9/10
[58] Field of Search ...................... 182/187, 188, 222

[56] References Cited
UNITED STATES PATENTS

| | | | |
|---|---|---|---|
| 1,915,715 | 6/1933 | Bodendieck | 182/188 |
| 2,709,626 | 5/1955 | Woodburn | 182/222 |
| 3,030,160 | 4/1962 | Tandy | 182/187 |
| 3,419,108 | 12/1968 | Mobbs | 182/187 |
| 3,513,940 | 5/1970 | Ussery | 182/187 |

*Primary Examiner*—Reinaldo P. Machado
*Attorney, Agent, or Firm*—Clarence A. O'Brien; Harvey B. Jacobson

[57] ABSTRACT

A generally horizontal support platform including opposite inner and outer ends is provided and an elongated brace structure has one end thereof pivotally supported from the outer end portion of the platform for swinging relative to the latter about an axis extending transversely of the brace structure and the platform between a first collapsed position with the brace structure closely underlying and substantially paralleling the platform and the other end of the brace structure projecting outwardly of the inner end of the platform and a second operative position with the other end of the brace structure inclined downwardly from the platform at an angle between 30 and 60 degrees relative to the latter and terminating downwardly in generally vertical alignment with the inner end of the platform. An elongated flexible tether structure is anchored to the inner end of the platform and may be secured about a tree trunk against which the inner end of the platform is abutted. Further, the other or free end of the brace structure includes bark penetrating structure for frictionally engaging and biting into a portion of the tree trunk against which the inner end of the platform is abutted spaced below the platform.

8 Claims, 9 Drawing Figures

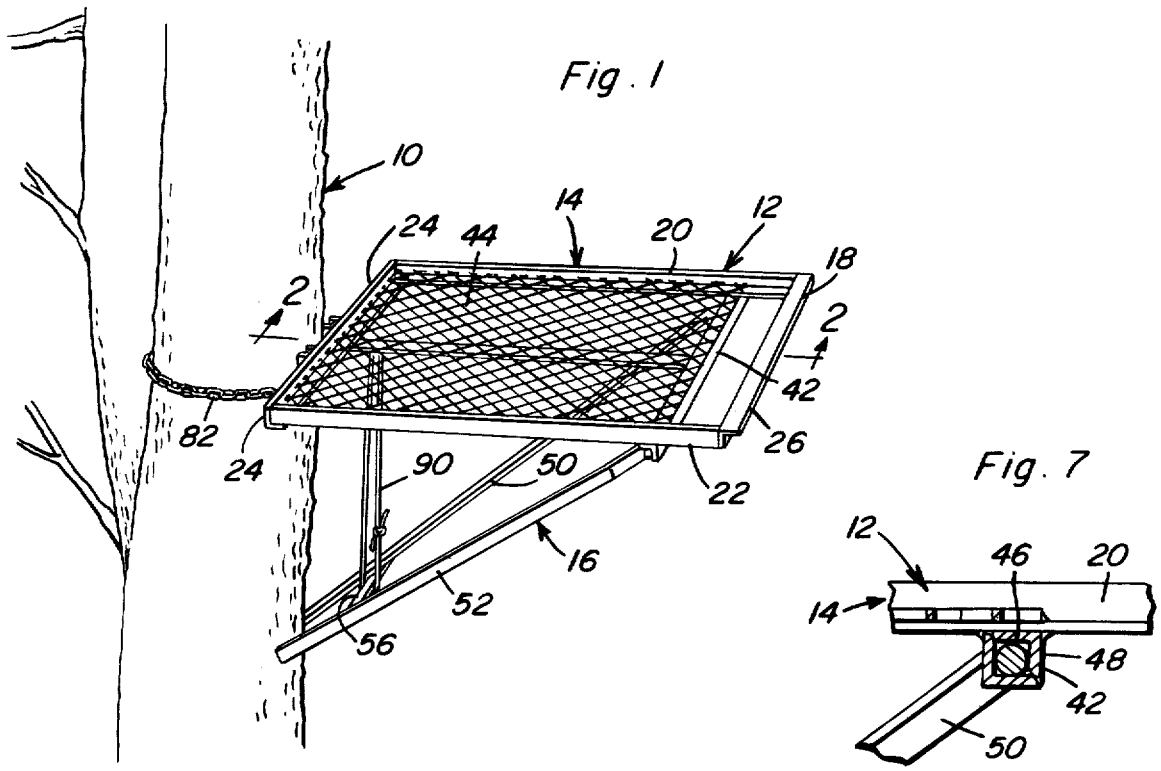
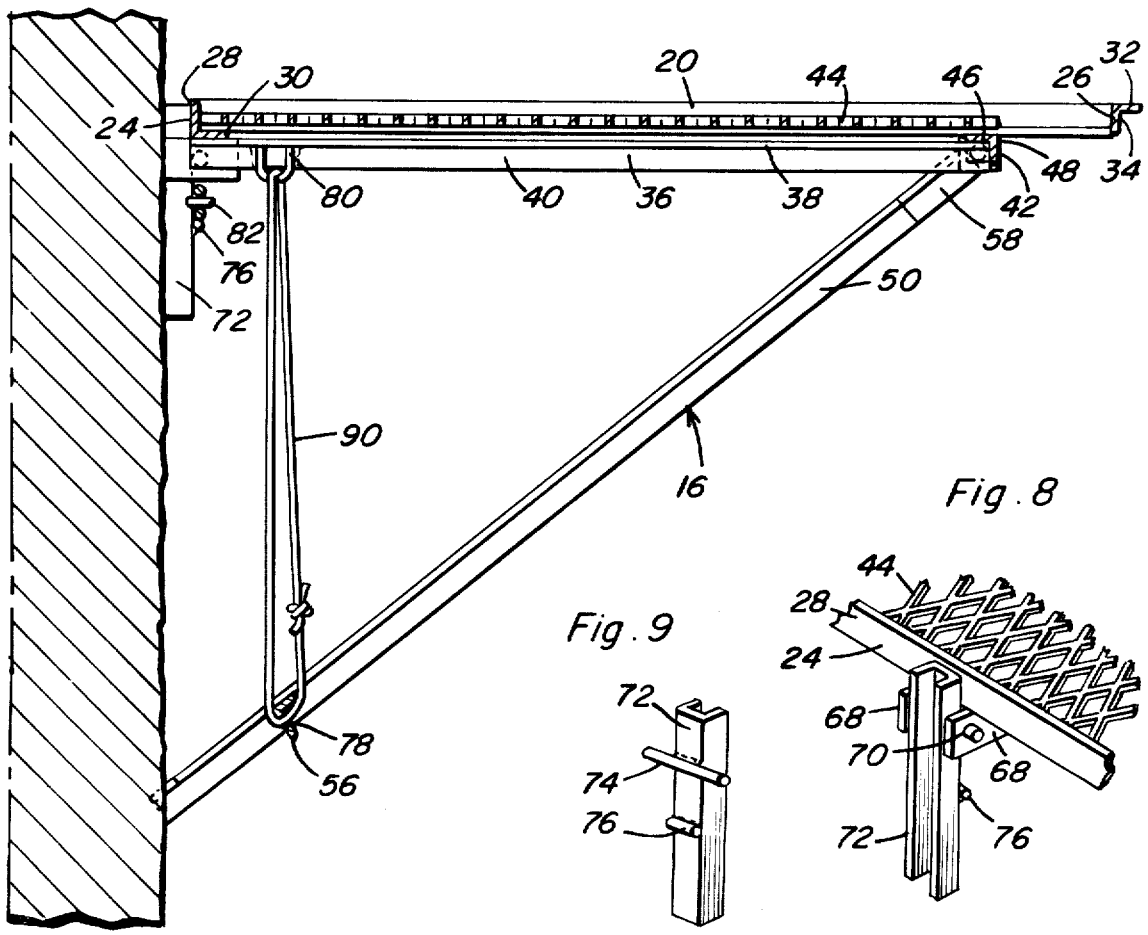

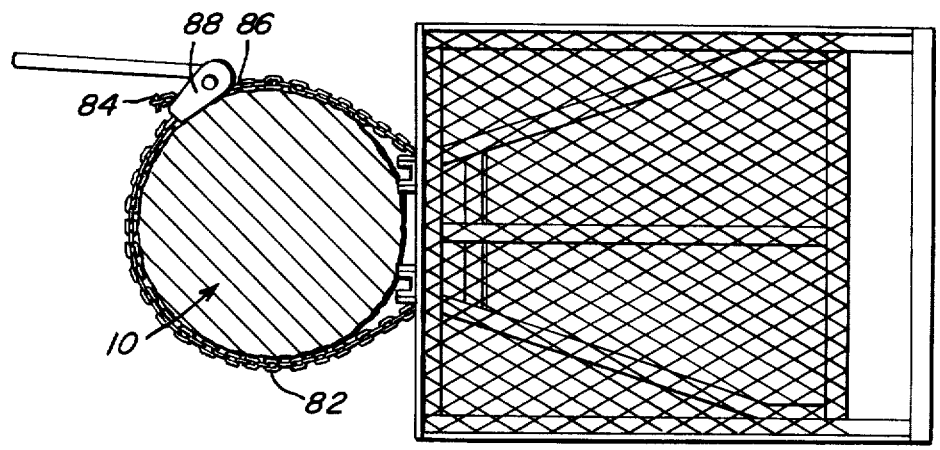
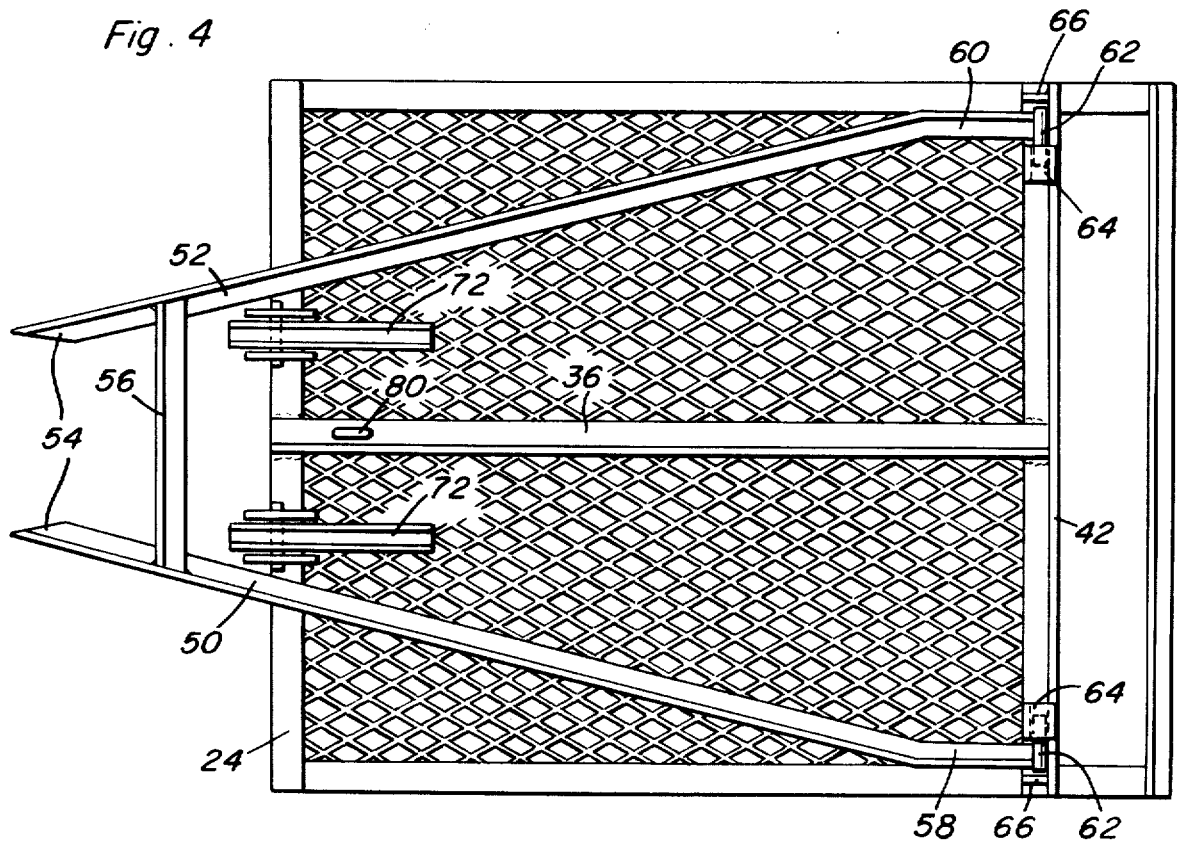
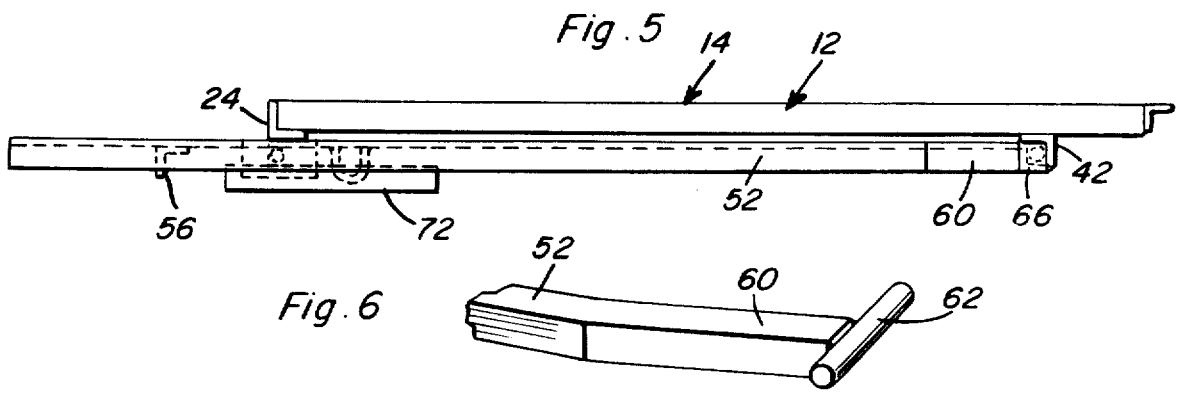

3,885,649

1
HUNTER'S TREE STAND

BACKGROUND OF THE INVENTION

It is often desirable for hunters to assume a stand in an elevated position above the terrain upon which they are hunting. By a hunter obtaining support in an elevated position above the ground and in a manner such that the hunter may remain substantially motionless the hunter's view of the surrounding terrain is increased and his field of aim is invariably also increased, especially in a wooded area. Further, while it is possible for a hunter to assume a stand at ground level, a hunter assuming a stand in an elevated position is far less likely to be seen by game which is being hunted.

There have been various types of hunters' stands heretofore designed and examples of these and similar structures may be found in U.S. Pat. Nos. 3,318,415, 3,392,802, 3,419,108 and 3,513,940. However, the tree stand of the instant invention includes structural and operational features which renders it a more stable support, more readily folded in a compact state, more readily erectable on and demountable from an associated tree trunk and lighter and thus more easily carried when in a folded condition.

BRIEF DESCRIPTION OF THE INVENTION

The hunter's tree stand of the instant invention is designed in a manner whereby it may be readily fabricated and carried on the back of a hunter to a tree selected as the site of the hunter's stand. The invention consists primarily of a perimeter framework having an expanded metal covering supported therefrom and extending thereacross and the mechanical features of the stand are such that it may be readily erected by a hunter finding it necessary to climb the tree upon which the stand is to be erected.

The main object of this invention is to provide a tree stand which will be operative to be supported in a stable and secure manner from a selected tree.

Another object of this invention, in accordance with the immediately preceding object, is to provide a stand which may be folded when not in use for ease in carrying from one location to another.

Yet another object of this invention is to provide a stand of light weight construction.

A further object of this invention is to provide a stand in accordance with the preceding objects and which will provide adequate support for vertical loads as well as adequate support against lateral shifting relative to an associated tree trunk.

A final object of this invention to be specifically enumerated herein is to provide a stand in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the stand of the instant invention in operative position supported from an associated tree trunk;

FIG. 2 is an enlarged vertical sectional view taken substantially upon the plane indicated by the section line 2—2 of FIG. 1;

FIG. 3 is a top plan view of the invention illustrated supported from a tree trunk and with the tree trunk illustrated in horizontal section;

FIG. 4 is a bottom plan view of the stand in a collapsed position;

FIG. 5 is a side elevational view of the stand in a collapsed position;

FIG. 6 is a fragmentary perspective view illustrating the end of one of the arms of the brace structure of the stand and the manner in which it is provided with a pivot pin;

FIG. 7 is a fragmentary vertical sectional view illustrating the manner in which the pivot pin illustrated in FIG. 6 is rotatably supported from the outer end of the platform portion of the stand;

FIG. 8 is a fragmentary perspective view of the inner end of the stand and illustrating one of the collapsible abutment members of the stand in operative position; and FIG. 9 is a perspective view of one of the abutment members of the stand illustrated as detached from the platform portion of the stand.

DETAILED DESCRIPTION OF THE INVENTION

Referring now more specifically to the drawings, the numeral 10 generally designates a tree trunk and the numeral 12 generally designated the hunter's stand of the instant invention which is illustrated in FIGS. 1, 2 and 3 of the drawings as supported from the tree trunk 10. The stand 12 includes a generally horizontal support platform referred to in general by the reference numeral 14 and an elongated brace structure referred to in general by the reference numeral 16.

The support platform 14 includes a frame 18 including opposite side longitudinal angle members 20 and 22 and opposite end angle members 24 and 26 extending and connected between corresponding ends of the longitudinal angle members 20 and 22. The angle members 20 and 22 include outer upstanding flanges and lower inwardly projecting flanges and the angle member 24 includes an outer upstanding flange 28 and a lower inwardly projecting flange 30. However, the angle member 26 includes a horizontal outer flange 32 and a depending inner flange 34.

The angle members 20, 22, 24 and 26 are secured together at adjacent ends in any convenient manner such as by welding. Also, a center longitudinal angle member 36 including an upper horizontal flange 38 and a depending lower flange 40 has one end secured beneath the mid-portion of the angle member 24 and the other end thereof secured to the mid-portion of a transverse angle member 24 extending and secured between the outer ends of the angle members 20 and 22, the opposite ends of the angle member 42 being secured beneath the outer end portions of the angle members 20 and 22.

A panel 44 of expanded metal extends between the angle members 20 and 22 and the angle members 24 and 42. The panel 44 is generally rectangular and its marginal edges overlap and are secured to the lower horizontal flanges of the angle members 20, 22 and 24. Also, the outer marginal edge of the panel 44 overlies the angle member 42, the angle member 42 including an inwardly projecting upper horizontal flange 46 and a depending outer flange 48.

The elongated brace structure 16 includes a pair of opposite side members 50 and 52 constructed of angle iron. The side members 50 and 52 are convergent toward one pair of ends thereof which are sharpened as at 54. A transverse angle iron brace 56 is secured between the convergent ends of the side members 50 and 52 a spaced distance from the sharpened terminal ends thereof and the divergent ends of the side members 50 and 52 include angulated parallel end portions 58 and 60 to which transverse pivot pins 62 are secured.

Short angle member sections 64 are secured to and open toward the open sides of the opposite end portions of the angle member 42 and the adjacent ends of the pivot pins 62 are rotatably received between the angle member sections 64 and the opposing end portions of the angle member 42. Also, a pair of abutment flanges 66 are secured to the flanges 46 and 48 of the angle member 42 at the opposite ends thereof immediately outwardly of the remote ends of the pivot pins 62 and with the abutment flanges or members 66 being disposed in the included angles formed by the end portions of the flanges 46 and 48. Thus, the abutment flanges 66 prevent retraction of the adjacent ends of the pivot pins 62 from between the angle member sections 64 and the opposing opposite end portions of the angle member 42.

Longitudinally spaced portions of the angle member 24 on opposite sides of the corresponding end of the angle member 36 have pairs of spaced apart mounting flanges 68 secured to the undersurfaces of the flange 30 and the mounting flanges 68 project outwardly of the outer surface of the flange 28. Each pair of mounting flanges 68 has a pair of registered bores 70 formed therethrough and an elongated channel-shaped abutment member 72 is received between the outwardly projecting ends of each pair of mounting flanges 68 and includes a transverse pivot pin 74 whose opposite ends are rotatably received through the corresponding bores 70 whereby the abutment members 72 may be swung between the collapsed positions thereof illustrated in FIGS. 4 and 5 of the drawings closely underlying and paralleling the support platform 14 and operative vertical positions such as that illustrated in FIGS. 2 and 8 of the drawings with the upper ends of the abutment members 72 abutted against the outer side surfaces of the opposing portions of the flange 28. Also, each abutment member 72 has a cross rod 76 secured thereto spaced below the corresponding pivot pin 74. Still further, the mid-portion of the angle iron brace 56 has a bore 78 formed therethrough and an anchor eye 80 is secured to and projects downwardly from the end portion of the angle member 36 secured to the angle member 24.

An elongated link chain is provided and includes a pair of opposite end portions 84 and 86. The tether member 82 carries a clamp structure 88 on its end portion 86 and the clamp structure 88 is engageable with the end portion 84 to tension the tether member 82 about any object such as the tree trunk 10. Also, a second elongated flexible tether member 90 is provided and passed through the bore 76 as well as the anchor eye 80. The length of the tether member 90 is such that the brace structure 16 will be inclined between 30 degrees and 60 degrees relative to the support platofrm 14 when the tether member 90 is tensioned.

In operation, the stand 12 may be readily back-packed by a hunter to a location in which the hunter wishes to take a stand. Then, the hunter may climb an appropriate tree and erect the stand 12 in the manner illustrated in FIGS. 1 and 2 of the drawings. In erecting the stand 12, the tether member 82 is first encircled about the trunk 10 and also those portions of the abutment members 72 disposed between the lower edges of the mounting flanges 68 and the abutment rods 76. Then, the tether member 82 is tensioned about the tree trunk 10 by means of the clamp structure 88. Thereafter, the brace structure 16 may have its free end lowered to a position with the tether member 90 tensioned and the sharpened ends 54 of the side members 50 and 52 may be engaged with the tree trunk 10 and embedded therein by pulling downward on the outer end of the support platform 14. At this point, the stand 12 is fully erected on the tree 10 and the hunter may assume a rest position on top of the support platform 14. At this point, the stand 12 is fully erected on the tree 10 and the hunter may assume a rest position on top of the support platform 14.

If it is desired, light-weight metals and metals which are non-corrosive may be used in the construction of the stand 12. Such metals include aluminum and steel which has been galvanized for non-corrosiveness.

The foregoing is considered as illustrative only of the principles of the invention. Further, since numerous modifications and changes will readily occur to those skilled in the art, it is not desired to limit the invention to the exact construction and operation shown an described, and accordingly all suitable modifications and equivalents may be resorted to, falling within the scope of the invention.

What is claimed as new is as follows:

1. A hunter's tree stand including a generally horizontal support platform including opposite inner and outer ends, an elongated brace structure pivotally supported at one end from the outer end portion of said platform for swinging relative to the latter about an axis extending transversely of said brace structure and said platform between a first collapsed position with said brace structure closely underlying and substantially paralleling said platform and the other end of said brace structure projecting outwardly of the inner end of said platform and a second operative positon with said other end of said brace structure inclined downwardly from said platform and terminating downwardly in generally vertical alignment with the inner end of said platform, means anchored to said inner end of said platform and adapted to be secured about a tree trunk against which said inner end of said platform is abutted, the other end of said brace structure including means adapted to frictionally engage a lower portion of said tree trunk below said platform, said brace structure including interconnected longitudinal opposite side members, the ends of said opposite side members adjacent the outer end of said platform including transverse pivot pin portions projecting laterally outwardly therefrom toward each other and pivotally supported from the outer end portion of said support platform, said outer end portion of said support platform including a transverse angle member, the opposite end portions of said angle member including angle member sections opening theretoward and secured to the open side of said transverse angle member a spaced distance inwardly of the opposite ends of said transverse angle member, the adjacent ends of said pivot pins being received between the confronting surfaces of said angle member sections and the opposing surfaces of the opposite end portions of said transverse angle member, and abutment flanges carried by the opposite end portions of said transverse angle member and closely opposing the remote ends of said pivot pins.

2. A hunter's tree stand including a generally horizontal support platform includng opposite inner and outer ends, an elongated brace structure pivotally supported at one end from the outer end portion of said platform for swinging relative to the latter about an axis extending transversely of said brace structure and said platform between a first collapsed position with said brace structure closely underlying and substantially paralleling said platform and the other end of said brace structure projecting outwardly of the inner end of said platform and a second operative positon with said other end of said brace structure inclined downwardly from said platform and terminating downwardly in generally vertical alignment with the inner end of said platform, elongated flexible tether member means anchored to said inner end of said platform and adapted to be secured about a tree trunk against which said inner end of said platform is abutted, the other end of said brace structure including means adapted to frictionally engage a lower portion of said tree trunk below said platform, elongated abutment members spaced along said inner end of said platform on opposite sides of the transverse center thereof and pivotally supported from said platform for angular displacement about axes extending transversely of said platform and spaced intermediate the opposite ends of said abutment members for swinging movement between folded positions closely underlying and generally paralleling said support platform and operative substantially vertical positions with the upper ends of said abutment members abutted against the end edge portions of said inner end of said support platform and the lower ends of said abutment members depending downwardly below said inner end of said platform, the surface portions of said abutment members facing outwardly of said inner end of said platform when said abutment members are in said operative vertical positions being adapted for frictionally engaging a tree trunk against which said inner end of said platform is abutted, said tether member being passed about the sides of said abutment members facing toward said outer end of said platform when said abutment members are in the operative vertical positions thereof.

3. The combination of claim 1 including an adjustable length second tether member secured between the inner end portion of said platform and said other end of said brace structure.

4. The combination of claim 1 wherein said support platform includes a perimeter frame and an expanded metal panel supported from and extending across said perimeter frame.

5. A hunter's tree stand including a generally horizontal support platform including opposite inner and outer ends, an elongated brace structure pivotally supported at one end from the outer end portion of said platform for swinging relative to the latter about an axis extending transversely of said brace structure and said platform between a first collapsed position with said brace structure closely underlying and substantially paralleling said platform and the other end of said brace structure projecting outwardly of the inner end of said platform and a second operative position with said other end of said brace structure inclined downwardly from said platform and terminating downwardly in generally vertical alignment with the inner end of said platform, elongated flexible tether member means anchored to said inner end of said platform and adapted to be secured about a tree trunk against which said inner end of said platform is abutted, the other end of said brace structure including means adapted to frictionally engage a lower portion of said tree trunk below said platform, said brace structure including convergent longitudinal opposite side members, a transverse brace member secured between the convergent ends of said opposite side members of spaced distance from their terminal ends, said terminal ends beng sharpened for biting into a tree turnk, the divergent ends of said opposite side members including transverse pivot pin portions projecting laterally outwardly therefrom toward each other and pivotally supported from the outer end portion of said support platform, said outer end portion of said support platform including a transverse angle member, the opposite end portions of said angle member including angle member sections opening theretoward and secured to the open side of said transverse angle member a spaced distance inwardly of the opposite ends of said transverse angle member, the adjacent ends of said pivot pins being received between the confronting surfaces of said angle member sections and the opposing surfaces of the opposite end portions of said transverse angle member, and abutment flanges carried by the opposite end portions of said transverse angle member and closely opposing the remote ends of said pivot pins.

6. The combination of claim 5 including elongated abutment members spaced along said inner end of said platform on opposite sides of the transverse center thereof and pivotally supported from said platform for angular displacement about axes extending transversely of said platform and spaced intermediate the opposite ends of said abutment members of swinging movement between folded positions closely underlying and generally paralleling said support platform and operative substantially vertical positions with the upper ends of said abutment members abutted against the end edge portions of said inner end of said support platform, the surface portions of said members facing outwardly of said inner end of said platform when said abutment members are in said operative vertical positions being adapted for frictionally engaging a tree trunk against which said inner end of said platform is abutted.

7. The combination of claim 6 wherein said tether member is passed about the sides of said abutment members facing toward said outer end of said platform when said abutment members are in the operative vertical positions thereof.

8. The combination of claim 7 including an adjustable length second tether member secured between the inner end portion of said platform and said other end of said brace structure.

* * * * *